Oct. 21, 1969  A. BÄHR  3,473,185
SLUDGE TREATING AND MOVING APPARATUS FOR DRY
BEDS OF SEWAGE PLANTS
Filed Aug. 30, 1967  12 Sheets-Sheet 2

INVENTOR:
ALFRED BÄHR
BY Robert H. Jacob
AGT

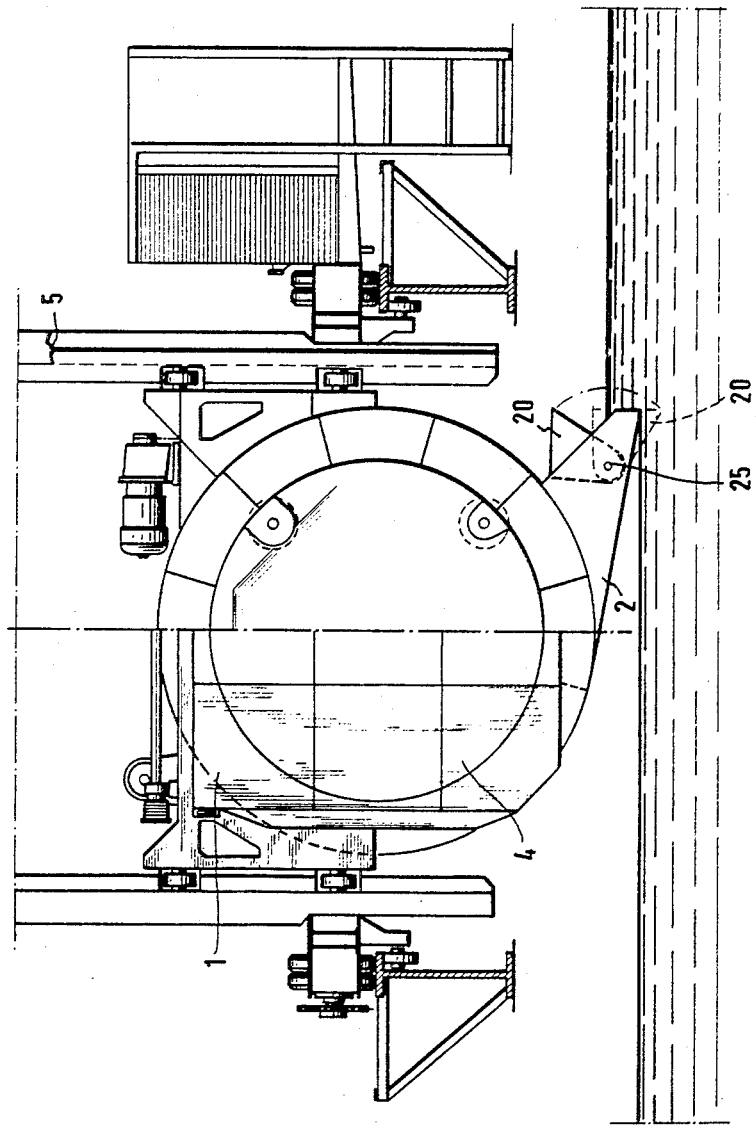

United States Patent Office 3,473,185
Patented Oct. 21, 1969

3,473,185
SLUDGE TREATING AND MOVING APPARATUS
FOR DRY BEDS OF SEWAGE PLANTS
Albert Bähr, 2a Barallelstrasse, 6633 Elversberg,
Saar, Germany
Filed Aug. 30, 1967, Ser. No. 664,398
Claims priority, application Germany, Sept. 1, 1966,
M 70,780; Feb. 7, 1967, M 72,678; Feb. 9, 1967,
M 72,709
Int. Cl. B01d 21/18, 21/24
U.S. Cl. 15—246.5        10 Claims

ABSTRACT OF THE DISCLOSURE

Sludge treating and moving apparatus where a cell wheel with a scraping knife mounted at the lower vertex of the cell wheel supporting a hopper is mounted for back and forth movement, for movement in a circle when in lowered position, and for movement into raised position for discharging the sludge for the hopper and where means are provided, such as a plow for loading the sludge in the bed.

Background of the invention

The invention relates to sludge removal apparatus of the type empolyed for cleaning out the dry beds of sewage plants. In sewage clearing plants for clearing the drain water or sewage effluence in cities and for industry, it is conventional to store the sludge that has been separated from the water in dry beds and then to remove the sludge and carry it off after it has been dried sufficiently.

Summary of invention

The invention relates to a sludge removal installation for the dry beds of sewage plants, and it is generally an object of the invention to provide an installation of this type which, while simple in construction, is highly efficient, requires low installation costs and which can be used for the many different types of work to be performed on drying beds.

More in particular, the invention concerns a sludge removal installation for drying beds of sludge plants having a cell wheel which is equipped at its lower vertex with a scraping or peeling knife for picking up the sludge and which wheel raises the sludge picked up by the scraping knife to its upper apex, where the sludge is cast off inwardly. In general, the invention provides for a cell wheel having a receiving and discharge hopper or bin. This hopper can advantageously be arranged within the cell wheel, and the cell wheel and hopper can be movable into a discharge position, for example by means of arcuate guide arms or the like. Thus, in the installation in accordance with the invention the cell wheel picks up the sludge at its lower apex, raises it to its upper apex and there delivers it to the hopper that is disposed inside the wheel, and then the wheel with the hopper after being filled can be brought into a position in which the hopper is discharged by delivering the sludge collected on the inside onto a truck or a conveyor or the like.

The scraping or peeling knife may in an arrangement in accordance with the invention be disposed at the lower apex of the cell wheel for rotation through 360, so that it can be turned to many different directions of operation of the cell wheel.

In accordance with the invention it is particularly advantageous to construct the installation in a manner that the cell whell is pivotally disposed together with the hopper and the loading arm to move over a range of 360°. Thus, in this embodiment of the invention the cell wheel, the hopper and the loading arm may be rotatable by 360° on a turning ring of a traveling gear, while advantageously a rotation through more than 360° is blocked by suitable abutments on the turning ring, which abutments prevent further turning, or it may also be blocked in that electric stop switches are provided which when 360° is reached, interrupt the supply of current to the drive motor that imparts rotary motion to the cell wheel.

In accordance with a further embodiment of the invention it is impossible to further equip the sludge clearing installation in a manner that simultaneously, it evenly distributes over the surface of the drying bed the filter layer which is arranged in such drying beds below the sludge layer, and which from time to time must be renewed, evenly over the surface of the drying bed. For this purpose the cell wheel is equipped in accordance with the invention with means that make possible the mechanical distribution of a new filter layer over the drying beds, while this distributing means may also be used to equally distribute the fresh sludge that is filled onto the beds for drying over the bed surface above the filter layer.

The distributing means is suitably arranged in this embodiment of the invention for independent upward and downward movement and disposed in a manner that when in use it can be sunk below the surface, where the scraping knife, which is arranged at the lower apex of the cell wheel, performs the operation of picking up the sludge.

The distributing means may in all cases be constructed in the form of a plow or shield and advantageously pivotable through a range of 360°. In this connection embodiments are also prossible where the entire apparatus with the distributing means is rotable through 360°.

This embodiment of the invention provides a still further advantage. In large single beds of sludge clearing plants it is frequently difficult to distribute the fresh sludge fed in evenly over the entire expanse of the bed. This fresh sludge spreads itself out from the supply point over a certain slope, but in view of the high viscosity of the sludge this is insufficient for the sludge to distribute itself to an even level over the entire surface of the bed. In accordance with an arrangement provided by the invention it is possible in this manner to obtain also an even distribution of the fresh sludge towards all sides of the bed and thus obtain an optimum degree of filling.

Brief description of the drawings

Further details and advantages of the invention will become apparent from the following description with reference to the embodiments illustrated in the accompanying drawings, in which—

FIG. 12 is a side view of a further embodiment.

Description of the invention

Figure 1:
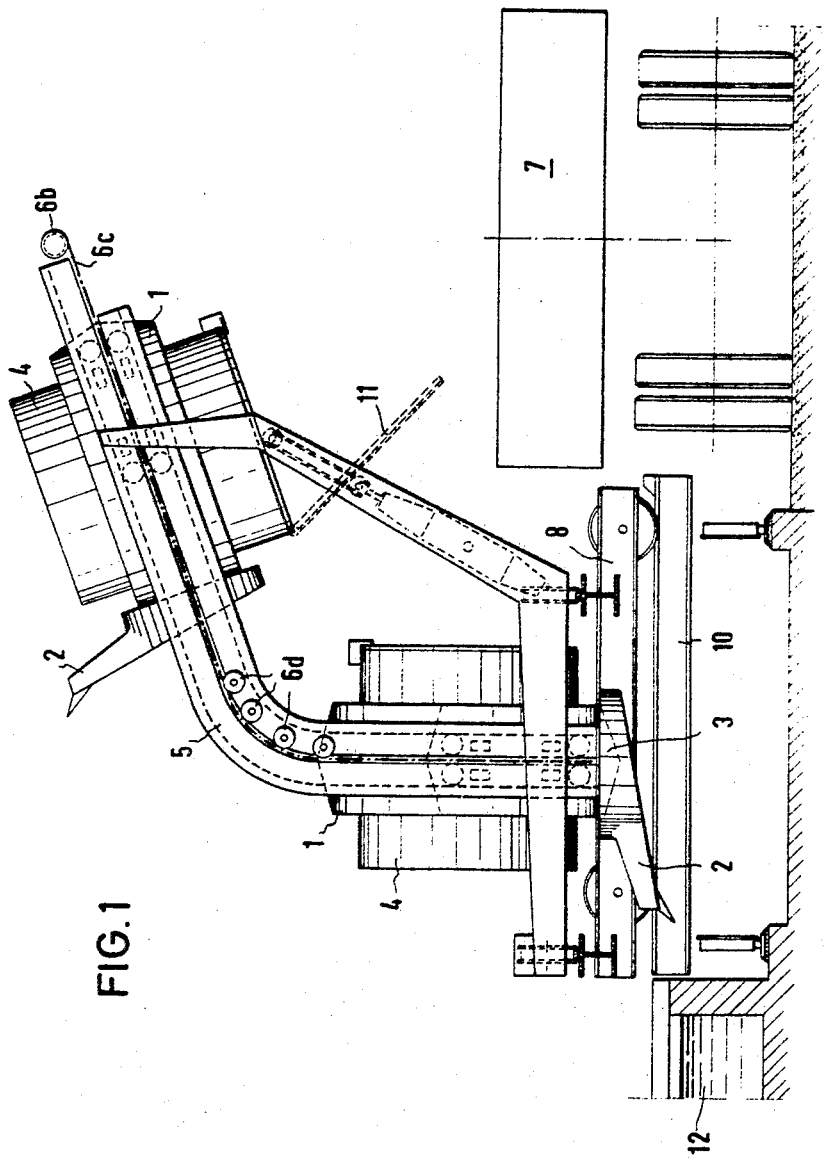
FIG. 1 is a side view of an embodiment of the invention.

In FIG. 1 of the drawings a cell wheel 1 is shown which rotates in stationary inner and outer rings, which arrangement may be such as disclosed in applicant's earlier application Ser. No. 471,899 of July 14, 1965 now Patent No. 3,362,039. The cell wheel 1 is driven by a motor 1a with a pawl 1b between a stationary ring 1d and a stationary outer ring 1e. A scraping or peeling knife 2 is arranged at the lower apex of the cell wheel 1, which in this embodiment is rotatable through 360° by means of knife 2 may be rotated in the guide ring with a motor by means of a toothed ring and a pawl into the desired operating position.

As indicated in the drawing, the transverse bulkheads 3 of the cell wheel 1 are suitably of triangular shape in order to make the pickup of sludge by the cell wheel as effective as possible.

Within the cell wheel 1 a receiving and discharge hopper 4 is arranged into the interior of which the cell wheel discharges the sludge, which has been picked up by the scraping knife 2 at the lower apex point, inwardly in the area of the upper apex point through the opening 1c in the inner ring 1d.

The cell wheel and hopper are adapted to be lowered in a frame such as an arcuate guide means 5 by a hoisting mechanism 6. The hoisting mechanism operates drums 6a and 6b onto which the cables 6c are wound to which the cell wheel 1 with inner ring 1d and outer ring 1e is fastened. The cables 6c are guided over pulleys 6d. In this manner cell wheel 1 with inner and outer rings 1d and 1e and hopper 4 can be lowered from the position of travel illustrated in FIG. 1 into a position corresponding to the level of the sludge and are also longitudinally movable by the guide means 5 into the discharge position illustrated at the upper right hand in FIG. 1. In this discharge position the discharge flap 11 which constitutes a side wall of the hopper 4 is opened and the sludge is discharged into a truck 7.

The cell wheel and the hopper which is in the form of a drum bucket are thus combined in accordance with the invention to constitute a type of clearing block in which the drum bucket receives the sludge that has been picked up. One end of the drum bucket is constructed in the form of a flap 11, which in the discharge position opens and closes automatically. The entire clearing block with scraping knife, cell wheel and drum bucket can be raised and lowered and is arranged for transport by means of a drive structure 8 on the edges of the walls 9 of the sludge beds 12. Different positions of the cell wheel 1 and scraping knife 2 are indicated in dash lines in FIG. 2.

Figure 2:
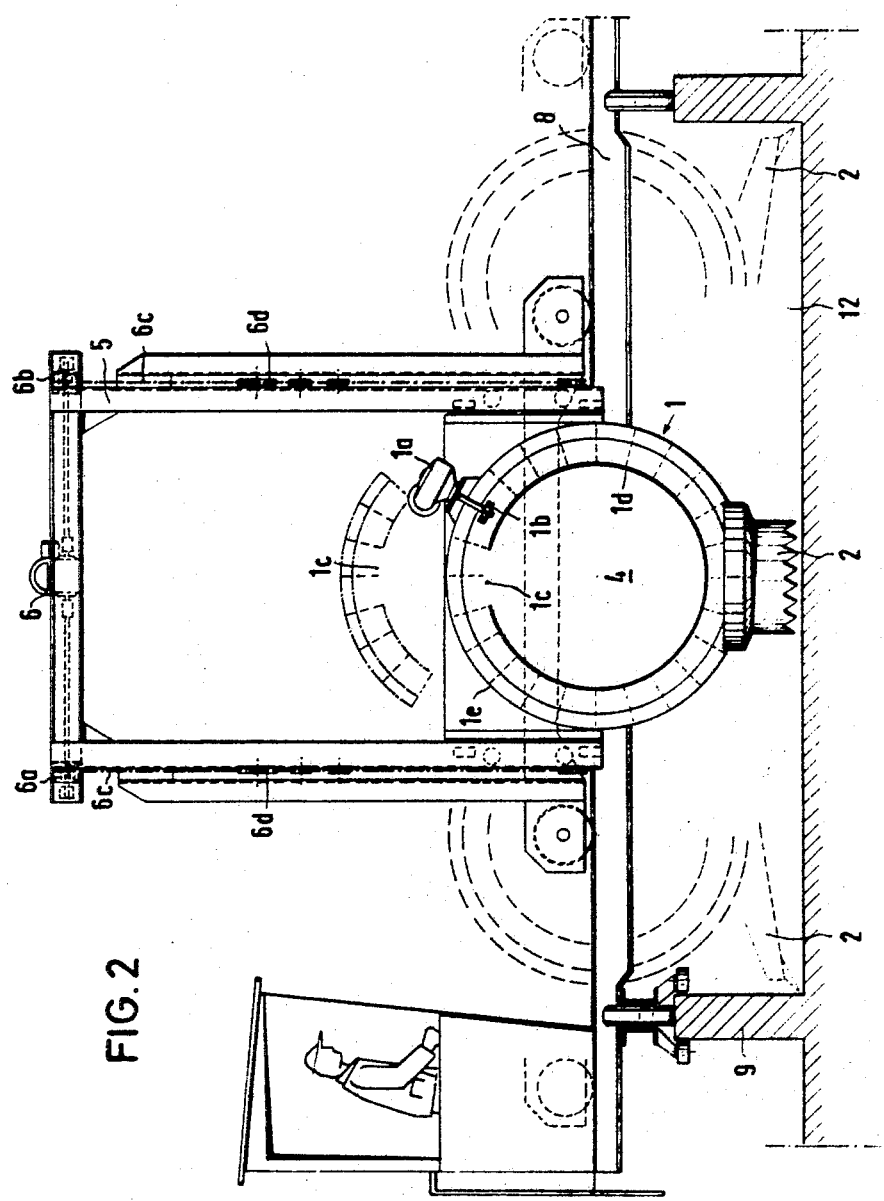
FIG. 2 is a view of the same embodiment taken at a 90° angle with respect to FIG. 1.
Figure 3:
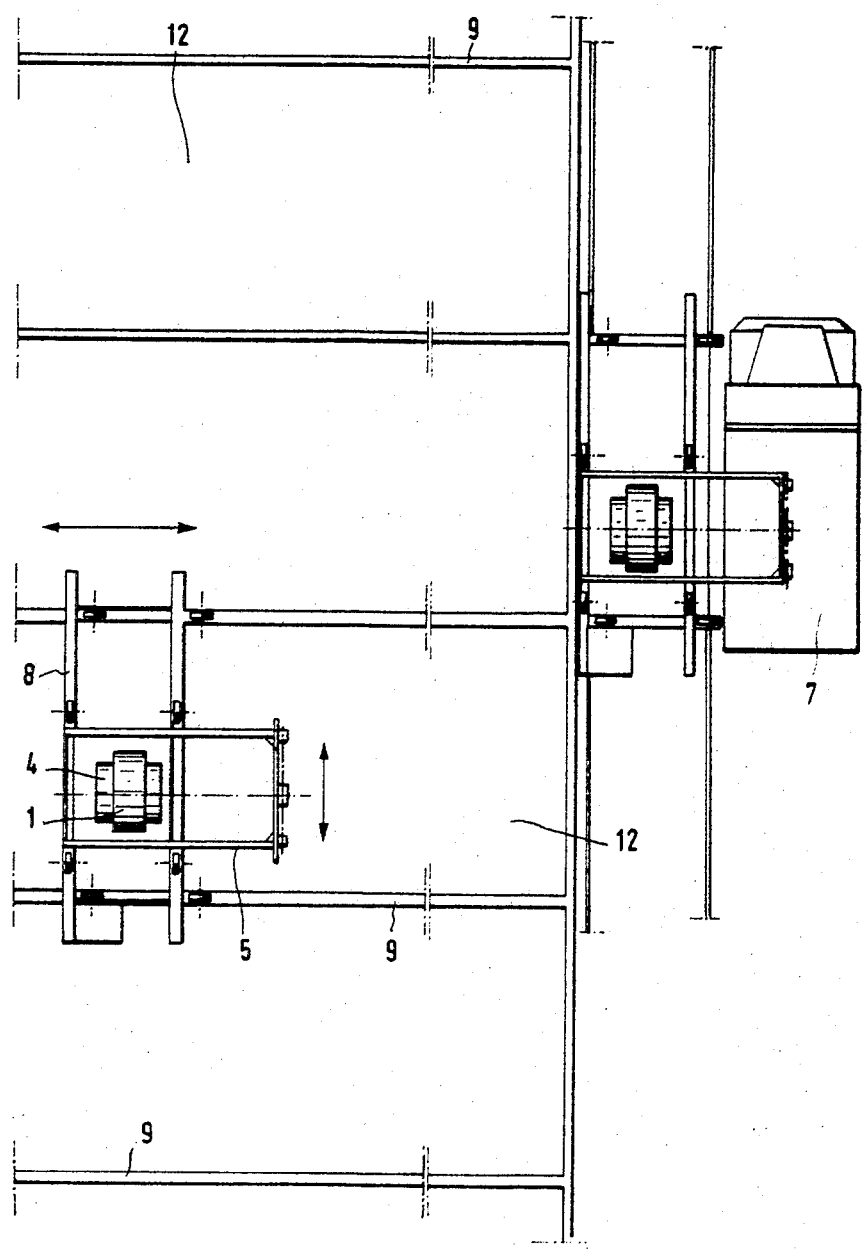
FIG. 3 is a top view of a dry bed installation which illustrates the manner of operation of the embodiment in accordance with FIGS. 1 and 2.
Figure 4:
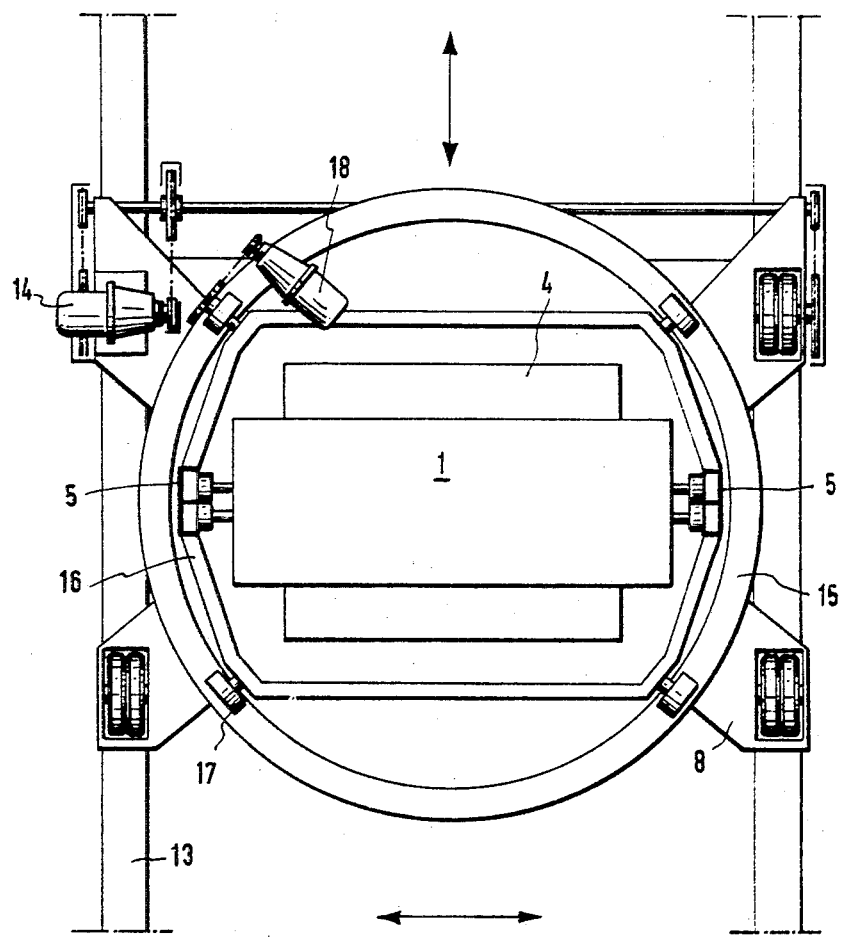
FIG. 4 is a top view of a different embodiment of the invention.

FIG. 3 is a plan view showing the drive structure 8 with the cell wheel 1 and the hopper in operation with the mobile unit movable about on the walls 9 of the drying beds. Here the cell wheel can be driven as illustrated by means of the drive structure 8 longitudinally of the beds in the walls 9 and pick up sludge. For this purpose the scraping knife 2 would be in the position illustrated in FIG. 1. However, it is also possible to turn the scraping knife 2 by 90° and then effect the clearing of the sludge in a manner that the cell wheel moves back and forth on the drive structure as indicated in FIG. 2. After each transverse drive of the cell wheel on the drive structure 8, the drive structure would then be driven along over a certain distance on the walls 9. When the hopper 4 of the cell wheel is filled with sludge, the cell wheel rides with the drive structure 8 to the end of the bed in order to unload the contents of the hopper onto a motor truck 7. In order to move the cell wheel to the next bed after one bed has been cleared of sludge a slide support 10 of known construction can be arranged as shown.

In the embodiment of FIGS. 4 to 7 the cell wheel 1 again is driven in stationary inner and outer rings by a separate motor and is provided at its lower apex with a scraping knife 2. In this embodiment of the invention the scraping knife 2 is rigidly secured to the outer housing of the cell wheel, and this tangentially at the most advantageous peeling angle so that a change in the direction of flow of the sludge picked up by the scraping knife is avoided as it is transferred onto the rotating transverse bulkheads. Also here a receiving and discharge hopper 4 is arranged in the cell wheel 1 into which the cell wheel discharges the sludge picked up by the scraping knife at the lower apex through a suitable opening in the position of the upper apex. Cell wheel 1 and hopper 4 are mounted in the arcuate guide means 5 and can be raised and lowered to different heights above the sludge bed by means of a hoisting device. The arcuate guide means 5 is furthermore extended upwardly to form an angularly offset loading arm 5a so that the cell wheel 1 with the hopper 4 can be raised into a discharging position within the arcuate guide means 5, 5a by the aforementioned lifting means, in which position a discharge flap 11 arranged at the end of the hopper 4 is opened so that the contents of the hopper is unloaded.

The cell wheel 1 and hopper 4 can be driven on a clearing bridge 13 which extends over the length or width of the sludge bed by means of the drive structure 8 which is driven by a special drive motor 14. At the topside, the drive or travel structure 8 is provided with a turning ring 15. The arcuate guide means 5 with the loading arm 5a are secured in a frame 16 which rotates by means of rollers 17 upon the turning ring 15 and is advantageously driven by drive means such as a special motor 18. Therefore, the cell wheel with hopper 4 and loading arm 6 can be rotated by 360° on the turning ring 15 whereby not only the scraping knife 2 can be turned into any desired operating direction of the cell wheel, but also the loading arm 5 can be swung to any desired loading position.

Suitably, the arrangement is such that the current supply cable to the motor 18 and to the drive motor secured to the cell wheel 1 for the inner ring of the cell wheel is arranged upon a spring cable drum which permits the current supply cable to be fed onto the turning ring 15 as the cell wheel is rotated. In this connection, an abutment limits the movement of the cell wheel 1 beyond 360° so that the cell wheel 1 cannot be turned beyond this position on the turning ring 15. The uncoiled cable lengths are received by hooks on the edge of the turning ring, and when returning the cell wheel the length which is freed is against automatically coiled onto the drum.

Figure 5:
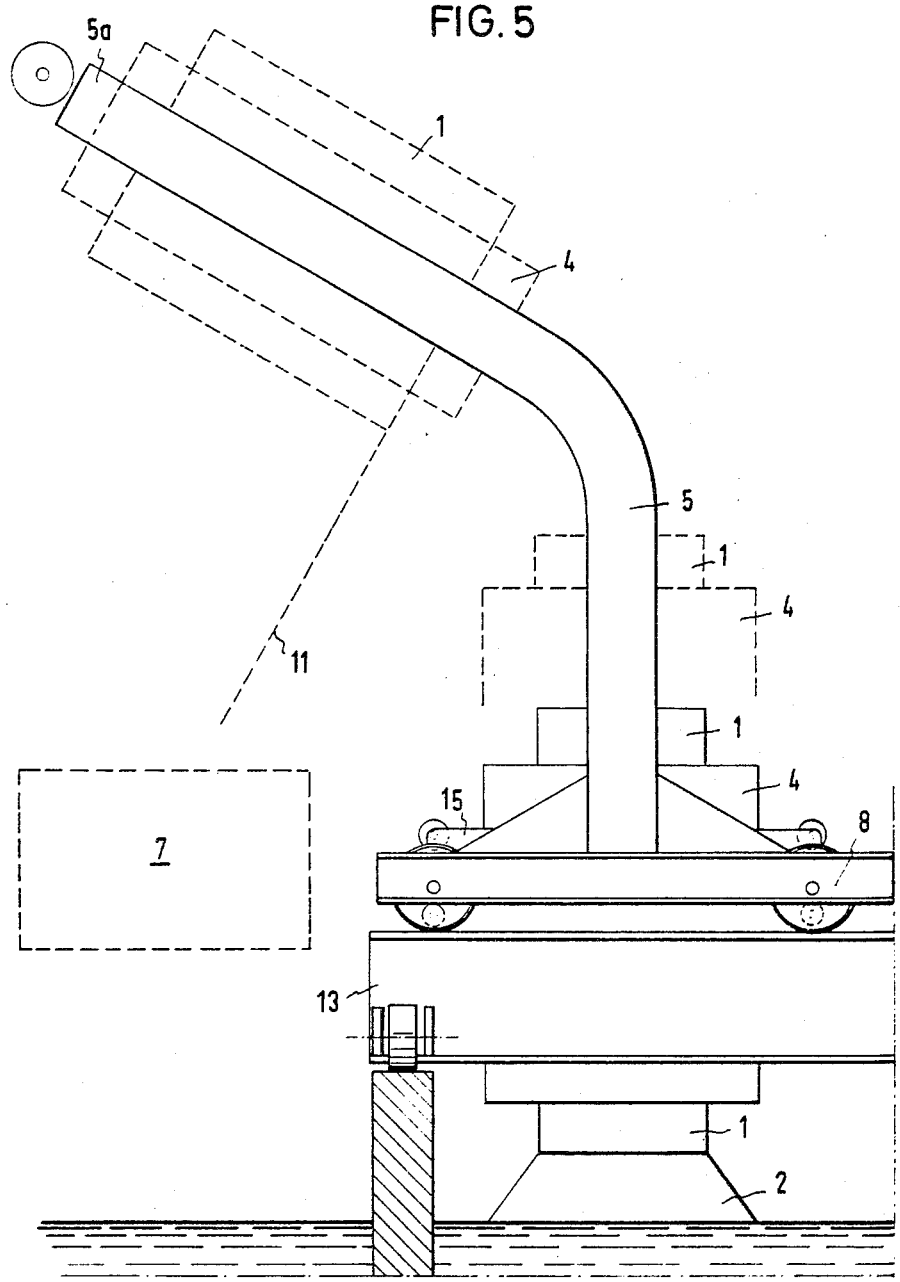
FIG. 5 is a side view of this embodiment.
Figure 6:
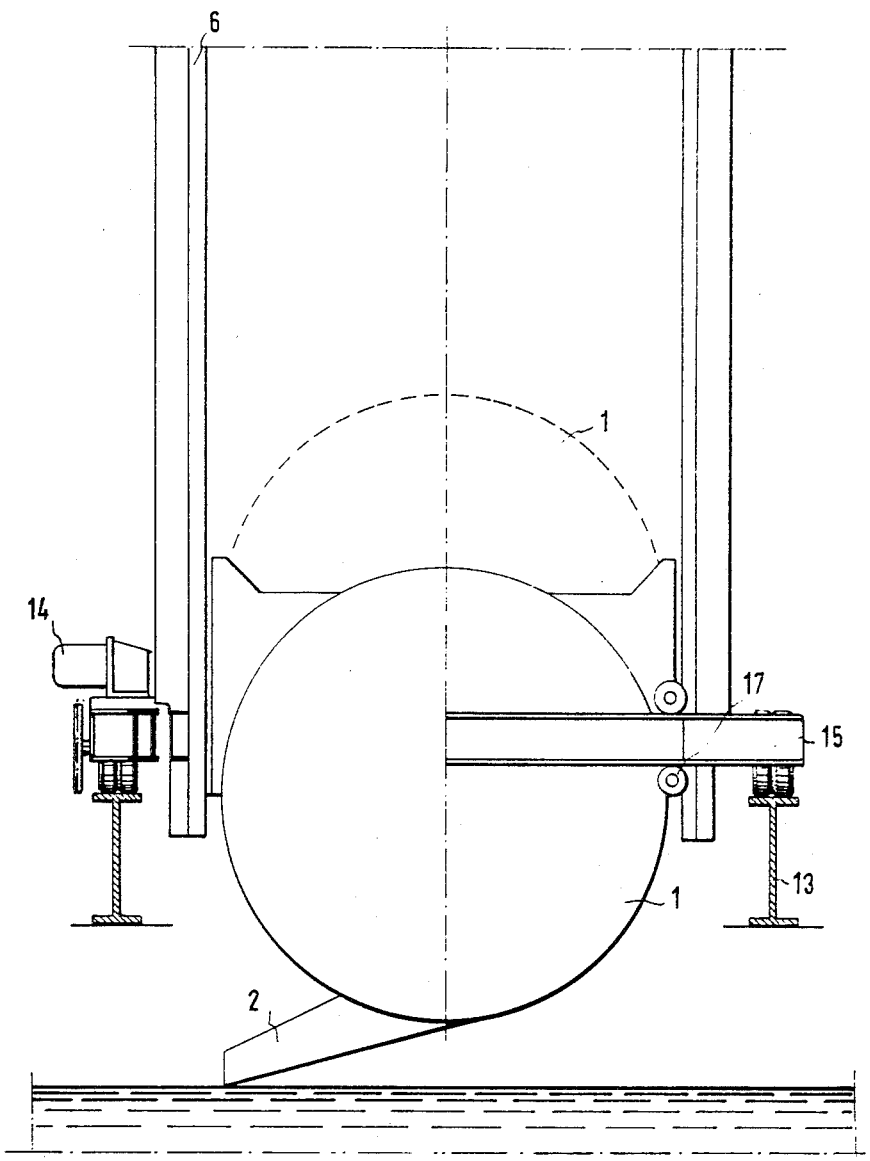
FIG. 6 is a front view of the same embodiment.

The different levels of operation which the cell wheel 1 with hopper 4 can assume in the arcuate guide means 5 are indicated in dashes in FIGS. 5 and 6.

Figure 7:
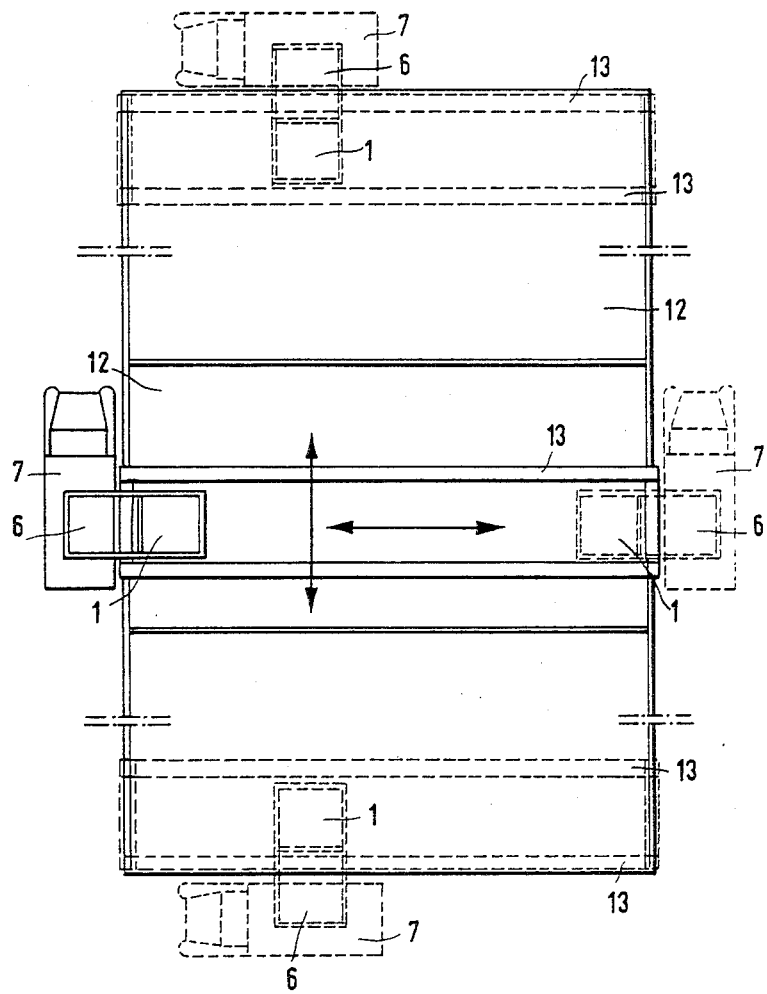
FIG. 7 is a top view of a dry bed installation where the manner of operation of an apparatus in accordance with FIGS. 4 to 6 is illustrated.
Figure 8:
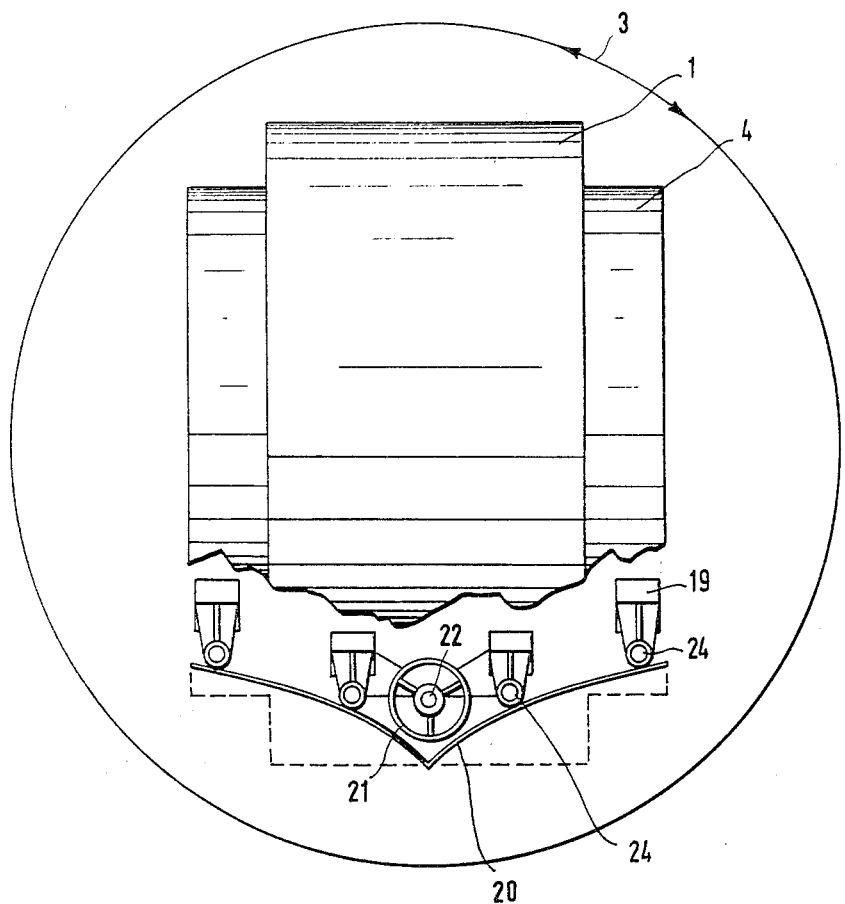
FIG. 8 shows a further embodiment of the invention with a distributor means, partly in schematic illustration from the top.
Figure 9:
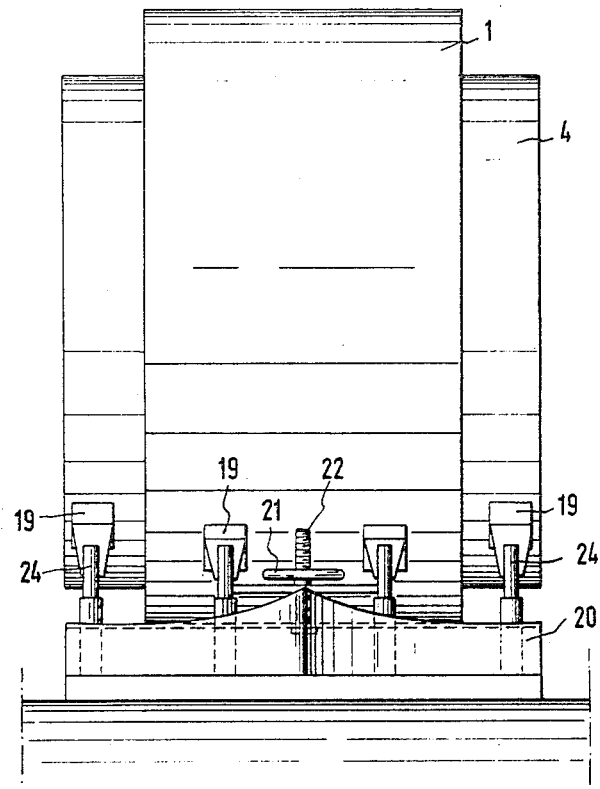
FIG. 9 is a front view of the apparatus shown in FIG. 8.
Figure 10:
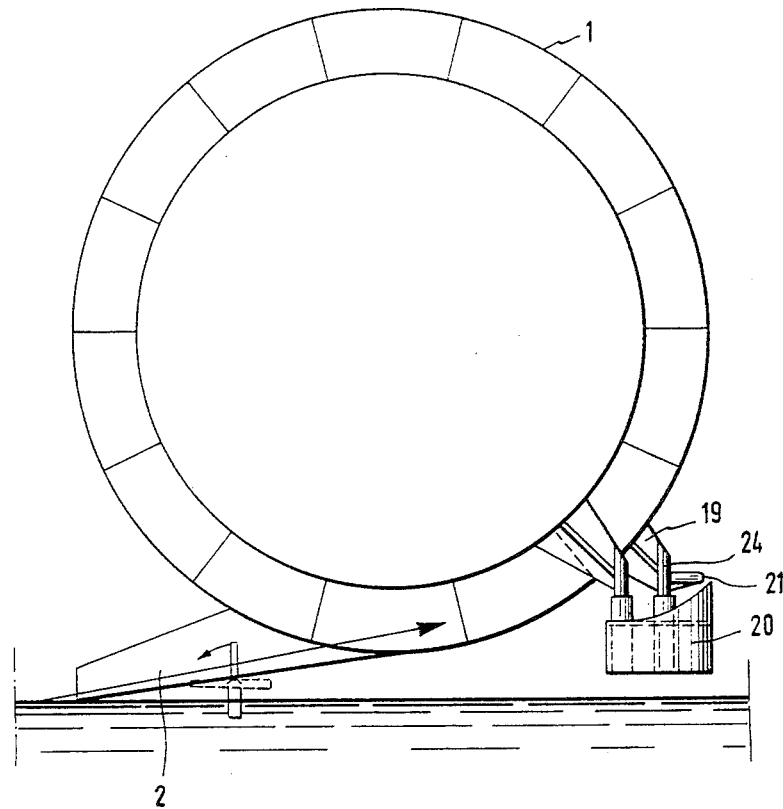
FIG. 10 is a side view of the apparatus shown in FIG. 8.
Figure 11:
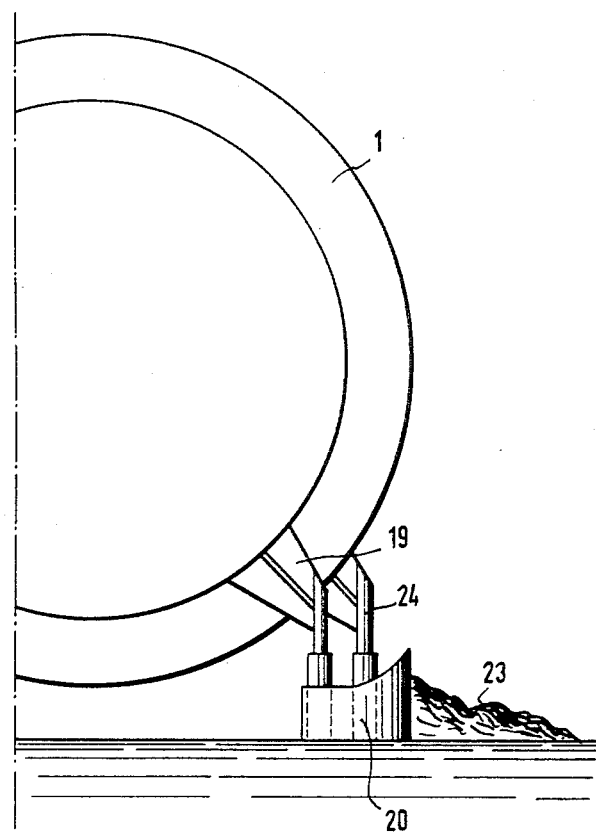
FIG. 11 is a side view of the embodiment in accordance with FIGS. 8 to 10 showing the distributor means in operative position.

In the embodiment illustrated in FIG. 7, the clearing bridge 13 is transportably journalled at its end upon the wall edges of the sludge beds 12. The cell wheel 1 with hopper 4 and loading arm 6 is arranged to be driven longitudinally of the clearing bridge 13 and can at the same time also be turned in the direction of driving by turning upon the turning ring 15. Thus, during transport across the bridge 13 in the forward and return direction, it can pick up the sludge by means of the scraping knife 2 and discharge it into the hopper 4. It is, however, also possible to set the cell wheel with its scraping knife 2 transversely with respect to the longitudinal direction of the clearing bridge 13 and to undertake the clearing operation by driving the bridge 13 upon the border of the sludge beds 12, while also during the return travel of the bridge the cell wheel with hopper 4 can again be turned by 180° into the new operating direction. Beyond that the cell wheel 1 with hopper 4 and discharge arm 6 can also be turned into the necessary position for unloading the sludge received by the hopper 4 into the motor truck 7. It is indicated in FIG. 7 that the cell wheel can, for example, unload in connection with the central sludge beds 12 at both ends of the clearing bridge 13, while at the two end beds (top and bottom) unloading is also possible along a longitudinal side of the clearing bridge 13.

In the embodiment in accordance with FIGS. 8–11, a cell wheel 1 is shown with the hopper 4 arranged in the interior thereof which during operation of the apparatus as a sludge clearer receives the sludge picked up by the cell wheel 1 by means of the scraping knife 2 and discharges it from time to time. This arrangement is transportable, for example, upon a clearing bridge which spans the width of the bed, by means of a drive structure. The cell wheel and hopper are rotatable on a turning ring 3 through 360°.

A distributing device in the form of a shield or plow for distributing the new material to be filtered, or the fresh sludge, is arranged on the housing of the cell wheel 1, or on the hopper 4, by means of brackets 19 in guide members 24. This shield or plow 20 can be lowered with respect to the brackets 19 to an operating depth illustrated in FIG. 11 in which it is positioned below the scraping knife 2 located below the cell wheel 1 at the lower vertex. For this purpose, a hand wheel 21 with spindles 22 may be provided. Thus, in this positon of operation the cell wheel 1 with hopper 4 and scraping knife 2 can be raised in vertical guide means (not illustrated) so that the scraping knife 2 is free of the bottom, while simultaneously plow 20 has been lowered by operating the hand wheel 21 into the position shown in FIG. 11. In this position the filter material 23 that has been delivered, for example by trucks alongside the drying bed, can be evenly distributed by means of the plow 20 over the entire surface of the bed. A similar manner of operation is also of advantage for supplying the fresh sludge, particularly into beds of large expanse. Owing to the rotating possibility around 360°, the distribution can be carried out in any required direction by suitable transportation of the cell wheel over the surface of the bed on its transverse support or carrier, for example, by driving the transverse carrier with the cell wheel longitudinally of the beds.

FIG. 12 illustrates a particularly simple embodiment of the construction and arrangement of the distributing apparatus. Here, the distributing means 20 are secured for turning directly on the scraping knife 2 about an axis 25. When the sludge is removed by the scraping knife 2, the distributing device 20 is simply moved upwardly so that the sludge can run into the scraping knife. If, however, fresh sludge is to be distributed over the surface of the bed, or if the filter layer is to be levelled, the distributing device 20 is turned downwardly about the axis 25 so that it assumes the position illustrated in dashes in FIG. 12.

Having now described my invention with reference to the embodimeints illustrated in the drawings what I desire to protect by Letters Patents is set forth in the appended claims.

I claim:

1. Sludge handling and moving apparaus for dry beds of sewage plants having border walls, comprising a frame defining guiding means movably mounted on the border walls, a cell wheel movably mounted on said frame and supporting a scraping knife at the lower apex thereof, said cell wheel being in sludge receiving position relative to said scraping knife, a receiving and discharge hopper defining an opening at its upper apex in receiving proximity to said cell wheel, motor means for driving said cell wheel to raise sludge from the lower apex to the upper apex of said cell wheel and there to discharge sludge through said opening into said hopper, said cell wheel and said hopper defining a mobile clearing block unit, and a hoist on said frame connected to said cell wheel operative to move said clearing block unit from lowered operating position to raised discharge position.

2. A sludge handling and moving apparatus for dry beds of sewage plants having border walls, said apparatus comprising a cell wheel supporting a scraping knife at the lower apex thereof in discharging relation to and movable with said cell wheel, a hopper supported inside said cell wheel and having a sludge receiving opening proximate its upper apex, a frame defining arcuate guide means and including a hoist for moving said cell wheel and hopper from operating position at the lower end of said frame to discharging position at the upper end of said frame and rotating means including a rotating ring supported on said border walls, and a drive means operative to rotate said frame with said cell wheel, said hopper and said scraping knife generally horizontally through 360°.

3. Sludge treating and moving apparatus in accordance with claim 1 where said hopper is disposed inside said cell wheel.

4. Sludge treating and moving apparatus in accordance with claim 1, where said guiding means are in the form of arcuate arms guiding said cell wheel between them.

5. Sludge treating and moving apparatus in accordance with claim 4, including a discharge flap movably mounted on said hopper, operative in the raised discharge position to open and discharge sludge from said hopper.

6. A sludge handling and moving apparatus in accordance with claim 2 including abutments intermediate said rotating ring and said drive means for preventing rotation beyond 360°.

7. Sludge handling and moving apparatus in accordance with claim 1, where said cell wheel is provided at its lower end with a distributing means of sludge.

8. Sludge handling and moving apparatus in accordance with claim 7, where said distributing means is mounted for pivotal movement about a horizontal axis on said scraping knife.

9. Sludge handling and moving apparatus in accordance with claim 2, where said cell wheel is provided at its lower end with a distributing means for sludge.

10. Sludge handling and moving apparatus in accordance with claim 9, where said distributing means is mounted for pivotal movement about a horizontal axis on said scraping knife.

References Cited

UNITED STATES PATENTS

| | | | |
|---|---|---|---|
| 783,129 | 2/1905 | Patterson | 198—77 XR |
| 1,804,399 | 5/1931 | Cole | 198—211 XR |
| 3,104,766 | 9/1963 | Sasadi | 198—96 XR |

ROBERT G. SHERIDAN, Primary Examiner

U.S. Cl. X.R.

198—77, 211; 214—17